(12) United States Patent
Palmer

(10) Patent No.: US 11,119,940 B2
(45) Date of Patent: Sep. 14, 2021

(54) SEQUENTIAL-WRITE-BASED PARTITIONS IN A LOGICAL-TO-PHYSICAL TABLE CACHE

(71) Applicant: Micron Technology, Inc., Boise, ID (US)

(72) Inventor: David A. Palmer, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/551,519

(22) Filed: Aug. 26, 2019

(65) Prior Publication Data

US 2021/0064536 A1 Mar. 4, 2021

(51) Int. Cl.
*G06F 12/1009* (2016.01)
*G06F 12/0891* (2016.01)

(52) U.S. Cl.
CPC ...... *G06F 12/1009* (2013.01); *G06F 12/0891* (2013.01); *G06F 2212/601* (2013.01); *G06F 2212/657* (2013.01)

(58) Field of Classification Search
CPC ............. G06F 12/1009; G06F 12/0891; G06F 12/0868; G06F 12/0893; G06F 12/10; G06F 2212/601; G06F 2212/657; G06F 2212/1024; G06F 2212/282; G06F 2212/7201
See application file for complete search history.

(56) References Cited

U.S. PATENT DOCUMENTS

| 8,654,792 B2 * | 2/2014 | Wiegand | H04L 65/607 370/477 |
| 2010/0100667 A1 * | 4/2010 | Kang | G06F 12/0246 711/103 |
| 2012/0089811 A1 * | 4/2012 | Sawai | G06F 12/1027 711/207 |

(Continued)

OTHER PUBLICATIONS

Ban, Y., Zhou, Y., Cheng, X., and J. Yi, "Coalesced TLB to Exploit Diverse Contiguity of Memory Mapping," Conference '17, Jul. 2017, Washington, DC.*

(Continued)

*Primary Examiner* — Tracy A Warren
(74) *Attorney, Agent, or Firm* — Nicholson De Vos Webster & Elliott LLP

(57) ABSTRACT

A method for managing sequential-write-based partitions in a logical-to-physical table cache is described. The method includes locating, by a memory subsystem, a first entry in a first sequential write partition in the cache that maps a first logical address in the set of sequential logical addresses of a read request to a first physical address, wherein each entry in the first sequential write partition corresponds to two sequential logical addresses that were sequentially written to sequential physical addresses of memory components of the memory subsystem. The method further includes determining, based on the first entry, the first physical address associated with the first logical address and a second physical address associated with a second logical address in the set of sequential logical addresses and fulfilling, by the (Continued)

memory subsystem, the read request based at least on the first physical address and the second physical address.

20 Claims, 8 Drawing Sheets

(56) References Cited

U.S. PATENT DOCUMENTS

| | | | | |
|---|---|---|---|---|
| 2017/0235488 A1* | 8/2017 | Call | ................. | G06F 3/0679 |
| | | | | 711/103 |
| 2018/0293174 A1* | 10/2018 | Song | ................. | G06F 12/1009 |
| 2019/0220416 A1* | 7/2019 | Jung | ................. | G06F 12/1009 |
| 2020/0042242 A1* | 2/2020 | Byun | ................. | G06F 3/0673 |

OTHER PUBLICATIONS

Chang, H.P., Taekyung, H., Jungi, J., and J. Huh, "Hybrid TLB Coalescing: Improving TLB Translation Coverage under Diverse Fragmented Memory Allocations," In Proceedings of ISCA 201717, 2017.*

Pham, B., Bhattacharjee, A., Eckert, Y., and G. Loh, "Increasing TLB Reach by Exploiting Clustering in Page Translations," 2014 IEEE 20th International Symposium on High Performance Computer Architecture (HPCA).*

* cited by examiner

```
                                                                                    200
                                                                                    ↙

┌─────────────────────────────────────────────────────────────────────────────────────┐
│ DETERMINE (1) A NUMBER OF PARTITIONS FOR A LOGICAL-TO-PHYSICAL TABLE CACHE FOR A    │
│ SET OF MEMORY COMPONENTS AND (2) A SEQUENTIAL WRITE LENGTH PER PARTITION IN THE     │
│ LOGICAL-TO-PHYSICAL TABLE CACHE, WHEREIN THE LOGICAL-TO-PHYSICAL TABLE CACHE IS A   │
│ CACHE STORED IN VOLATILE MEMORY FOR A LOGICAL-TO-PHYSICAL TABLE STORED IN           │
│ NON-VOLATILE MEMORY                                                                 │
│                                      202                                            │
└─────────────────────────────────────────────────────────────────────────────────────┘
                                        │
                                        ▼
┌─────────────────────────────────────────────────────────────────────────────────────┐
│ CONSTRUCT THE LOGICAL-TO-PHYSICAL TABLE CACHE TO INCLUDE THE NUMBER OF PARTITIONS   │
│ WITH THE DETERMINED SEQUENTIAL WRITE LENGTH FOR EACH PARTITION                      │
│                                      204                                            │
└─────────────────────────────────────────────────────────────────────────────────────┘
                                        │
                                        ▼
           ╱─────────────────────────────────────────────────────╲
          ╱  DETECT A WRITE REQUEST FOR THE MEMORY COMPONENTS OF  ╲────NO────┐
          ╲              THE MEMORY SUBSYSTEM?                    ╱          │
           ╲                         206                         ╱           │
            ╲─────────────────────────────────────────────────── ╱           │
                                    │                                        │
                                   YES                                       │
                                    ▼                                        │
┌─────────────────────────────────────────────────────────────────────┐      │
│ PERFORM A WRITE OPERATION TO THE MEMORY COMPONENTS TO FULFILL THE   │      │
│ WRITE REQUEST USING A SET OF PHYSICAL ADDRESSES                     │      │
│                              208                                    │      │
└─────────────────────────────────────────────────────────────────────┘      │
                                    │                                        │
                                    ▼                                        │
┌─────────────────────────────────────────────────────────────────────┐      │
│ UPDATE THE LOGICAL-TO-PHYSICAL TABLE CACHE AND/OR THE LOGICAL-TO-   │      │
│ PHYSICAL TABLE BASED ON THE WRITE TO THE MEMORY COMPONENTS          │      │
│                              210                                    │      │
└─────────────────────────────────────────────────────────────────────┘      │
                                    │                                        │
                                    ▼                                        │
           ╱─────────────────────────────────────────────────────╲           │
  ┌──NO───╱  DETECT A READ REQUEST THAT REFERENCES A SET OF       ╲◄─────────┘
  │       ╲                LOGICAL ADDRESSES?                     ╱
  │        ╲                         212                         ╱
  │         ╲─────────────────────────────────────────────────── ╱
  │                                 │
  │                                YES
  │                                 ▼
  │  ┌─────────────────────────────────────────────────────────────────┐
  │  │ TRANSLATE THE SET OF LOGICAL ADDRESSES OF THE READ REQUEST      │
  │  │ USING THE LOGICAL-TO-PHYSICAL TABLE CACHE, INCLUDING ONE OR     │
  │  │ MORE PARTITIONS OF THE LOGICAL-TO-PHYSICAL TABLE CACHE, TO      │
  │  │ DETERMINE A SET OF PHYSICAL ADDRESSES                           │
  │  │                          214                                    │
  │  └─────────────────────────────────────────────────────────────────┘
  │                                 │
  │                                 ▼
  │  ┌─────────────────────────────────────────────────────────────────┐
  │  │ FULFILL THE READ REQUEST BASED ON THE DETERMINED SET OF         │
  │  │ PHYSICAL ADDRESSES                                              │
  │  │                          216                                    │
  │  └─────────────────────────────────────────────────────────────────┘
  │                                 │
  └─────────────────────────────────┘
```

FIG. 2

SEQUENTIAL-WRITE-BASED PARTITIONS IN A LOGICAL-TO-PHYSICAL TABLE CACHE

TECHNICAL FIELD

The present disclosure generally relates to logical-to-physical table caches, and more specifically, relates to sequential-write-based partitions in logical-to-physical table caches.

BACKGROUND ART

A memory subsystem can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a flow diagram of an example method to manage sequential-write-based partitions in a logical-to-physical table cache, in accordance with some embodiments of the present disclosure.

DETAILED DESCRIPTION

Figure 1:
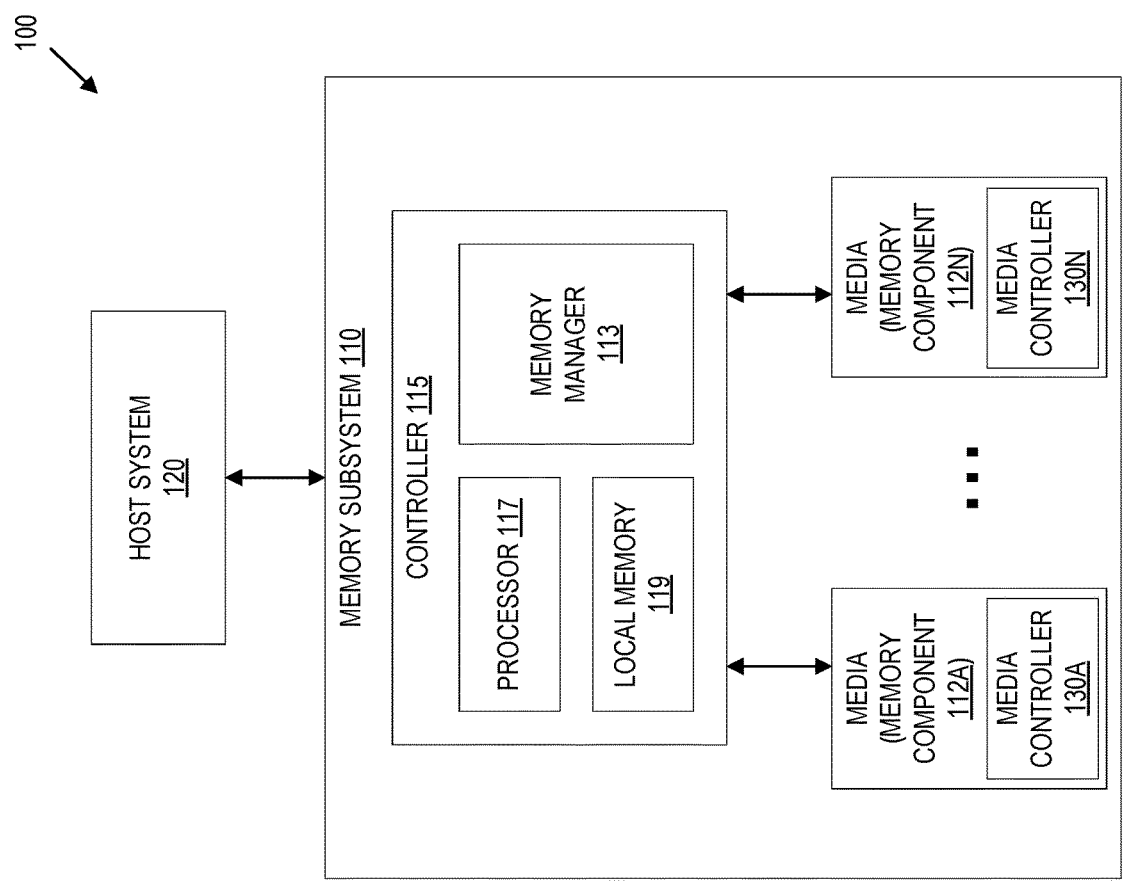
FIG. 1 illustrates an example computing environment that includes a memory subsystem, in accordance with some embodiments of the present disclosure.

Aspects of the present disclosure are directed to sequential-write-based partitions in a logical-to-physical table cache for a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more memory devices. The memory devices can include, for example, non-volatile memory devices, such as negative-AND NAND) memory devices and write-in-place memory devices, such as three-dimensional cross-point ("3D cross-point") memory devices, which is a cross-point array of non-volatile memory cells. Other types of memory devices, including volatile memory devices, are described in greater detail below in conjunction with FIG. 1. The host system can provide data to be stored at the memory subsystem and can request data to be retrieved from the memory subsystem.

Memory subsystems often use a combination of logical addresses and physical addresses for performing memory operations (e.g., read and write operations). In particular, logical addresses are used by host systems for generating memory requests (e.g., read and write requests), whereas physical addresses are used by the memory subsystem to identify memory elements in a set of memory components to fulfill the memory requests. To facilitate these multiple address spaces, the memory subsystem maintains a logical-to-physical table that maps logical addresses to physical addresses. For example, when the memory subsystem receives a write request from a host system that references a logical address, the memory subsystem locates a free memory element in an associated set of memory components and writes data from the write request to this free memory element. Thereafter, the memory subsystem records a physical address of the memory element in an entry of the logical-to-physical table corresponding to the logical address of the write request. Accordingly, when a read request is received from the host system that references the same logical address, the memory subsystem retrieves the corresponding physical address from the entry in the logical-to-physical table corresponding to the logical address and performs a read operation using the retrieved physical address. Thus, the logical-to-physical table maintains mappings between logical addresses used by host systems and physical addresses used by the memory subsystem. Maintaining these mappings in volatile memory can result in a faster translation between logical and physical addresses. However, based on the numerous logical addresses that can be used in the memory subsystem, the logical-to-physical table can be quite large with a potential size of several megabytes for a set of memory components. With limited volatile memory resources, memory subsystems cannot load the entire logical-to-physical table into main memory during normal operation. Instead, the memory subsystem maintains the entire logical-to-physical table in a high-latency but abundant non-volatile memory and loads only a subset of the entries/mappings from the logical-to-physical table into a lower-latency but more limited volatile main memory. In this configuration, the partial logical-to-physical table stored in volatile main memory can be considered a cache of the full logical-to-physical table stored in non-volatile memory. As the memory subsystem receives memory requests from the host system or memory requests are triggered internally, the memory subsystem swaps relevant entries/mappings of the logical-to-physical table from the non-volatile main memory into the logical-to-physical table cache in volatile media. Once added to the logical-to-physical table cache, the memory subsystem can perform logical address to physical address translations from this cache. Further, for memory requests that include multiple logical addresses, the memory subsystem utilizes appropriate mappings of the logical-to-physical table for performing translations for each logical address. The need for the memory subsystem to (1) move portions of the logical-to-physical table between media and (2) perform multiple address translations per memory request adds considerable overhead, including latency, to fulfillment of the memory request.

Aspects of the present disclosure address the above and other deficiencies by generating a logical-to-physical table cache that includes partitions based on sequential writes to logical addresses. In particular, one partition of the logical-to-physical table cache includes mappings between logical addresses and physical addresses regardless of whether the logical addresses have been sequentially written. This partition, which sometimes will be referred to as a non-sequential write partition, explicitly includes a reference to a physical address for each logical address represented in the non-sequential write partition. In contrast to the non-sequential write partition, the logical-to-physical table cache includes a set of sequential write partitions that provide a single logical address to physical address mapping to represent multiple logical addresses that have been sequentially written. In one embodiment, each sequential write partition maps a logical address to a longer sequence of addresses. For example, the set of sequential write partitions can include a first sequential write partition that includes a single logical address to physical address mapping (e.g., a single entry) for each set of N logical addresses that have been sequentially written, a second sequential write partition that includes a single logical address to physical address mapping for each set of $N^2$ logical addresses that have been sequentially written, a third sequential write partition that includes a single logical address to physical address mapping for each set of $N^3$ logical addresses that have been sequentially written, etc.

In response to a read request that includes a set of logical addresses, the memory subsystem can first attempt to translate the set of logical addresses using the non-sequential write partition of the logical-to-physical table cache. Using the non-sequential write partition, the memory subsystem attempts to locate entries that correspond to each logical address of the read request. When individual entries for the set of logical addresses are located in the non-sequential write partition, the memory subsystem uses the physical addresses of these entries to fulfill the read request. In response to misses in the non-sequential write partition, the memory subsystem attempts to locate matching entries in a sequential write partition of the logical-to-physical table cache for the logical addresses that resulted in a miss in the non-sequential write partition.

Only after misses in both the non-sequential write partition and the set of sequential partitions does the memory subsystem perform a swap from the logical-to-physical table in higher-latency non-volatile memory into the logical-to-physical table cache. Each logical address in the sequential write partitions represents a range of logical addresses, enabling the logical-to-physical table cache to map a larger number of addresses than a conventional non-sequential logical-to-physical table cache using the same number of entries. Accordingly, as described above, the sequential write partitions more efficiently utilize limited memory resources by (1) limiting the probability of a miss in the entire logical-to-physical table cache and consequent swaps from higher-latency non-volatile memory and (2) limiting the number of logical address to physical address lookups/translations for logical addresses that have been sequentially written.

FIG. 1 illustrates an example computing environment 100 that includes a memory subsystem 110 in accordance with some embodiments of the present disclosure. The memory subsystem 110 can include media, such as memory components 112A to 112N (also referred to as "memory devices"). The memory components 112A to 112N can be volatile memory components, non-volatile memory components, or a combination of such. A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory subsystems 110. In some embodiments, the host system 120 is coupled to different types of memory subsystem 110. FIG. 1 illustrates one example of a host system 120 coupled to one memory subsystem 110. The host system 120 uses the memory subsystem 110, for example, to write data to the memory subsystem 110 and read data from the memory subsystem 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single-level cells (SLCs), multi-level cells (MLCs), triple-level cells (TLCs), or quad-level cells (QLCs). In some embodiments, a particular memory component can include both an SLC portion and an MLC portion of memory cells. Each of the memory cells can store one or more bits of data used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped to form pages that can refer to a unit of a memory component 112A to 112N used to store data. With some types of memory (e.g., NAND), pages can be grouped to form blocks.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical address (e.g., a logical block address (LBA)) and a physical address (e.g., a physical block address) that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

Any one of the memory components 112A to 112N can include a media controller (sometimes referred to as a local controller) (e.g., media controller 130A and media controller 130N) to manage the memory cells of the memory component 112, to communicate with the memory subsystem controller 115, and to execute memory requests (e.g., read or write) received from the memory subsystem controller 115.

The memory subsystem 110 includes a memory manager 113 that can manage non-sequential-and sequential-write-based partitions in a logical-to-physical table cache. In some embodiments, the controller 115 includes at least a portion of the memory manager 113. For example, the controller 115 can include a processor 117 (processing device) configured to execute instructions stored in local memory 119 for performing the operations described herein. In some embodiments, the memory manager 113 is part of the host system 110, an application, or an operating system.

In some embodiments, the memory components 112A to 112N can be managed memory devices (e.g., managed NAND), which is a raw memory device combined with a local controller (e.g., media controller 130) for memory management within the same memory device package. A media controller 130 can include a memory manager 113.

The memory manager 113 can manage non-sequential-and sequential-write-based partitions in a logical-to-physical table cache to processing efficiency for read requests. Further details with regards to the operations of the memory manager 113 are described below.

FIG. 2 is a flow diagram of an example method 200 to manage sequential-write-based partitions in a logical-to-physical table cache, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the memory manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing device determines a number of partitions for a logical-to-physical table cache and a sequential write length per partition (i.e., the number of sequential logical addresses represented by each entry in the partition). In this configuration, each partition operates as a separate logical-to-physical table lookup for translating logical addresses (sometimes referred to as host addresses), which are used by the host system 120 to access data from the memory components 112A to 112N, and physical addresses, which are used for identifying a physical memory element (e.g., a managed unit, a memory cell, a byte of memory, a kilobyte of memory, etc.) in the memory components 112A to 112N. In one embodiment, the processing device can determine to always include a default non-sequential write partition and zero or more sequential write partitions in the logical-to-physical table cache. For example, the processing device can determine at operation 202 that four partitions will be used in the logical-to-physical table cache. In particular, the processing device can determine that the four partitions will include a single non-sequential write partition and three sequential write partitions. In this configuration, the non-sequential write partition includes mappings between logical addresses and physical addresses regardless of whether the logical addresses have been sequentially written (i.e., the non-sequential write partition has a sequential write length of one (i.e., one logical address). Specifically, the non-sequential write partition includes an explicit mapping to a physical address (i.e., a single entry) for each logical address represented in the non-sequential write partition. In contrast to the non-sequential write partition, the three sequential write partitions provide single logical address to physical address mappings (i.e., a single entry) to represent multiple logical addresses that have been sequentially written at various lengths. For instance, the processing device can determine that the first sequential write partition corresponds to a sequential write length of two such that each entry in the first sequential write partition is a logical address to physical address mapping for the first logical address in a set of two logical addresses that have been sequentially written. Similarly, the processing device can determine that the second sequential write partition corresponds to a sequential write length of four such that each entry in the second sequential write partition is a logical address to physical address mapping for the first logical address in a set of four logical addresses that have been sequentially written. Likewise, the processing device can determine that the third sequential write partition corresponds to a sequential write length of eight such that each entry in the third sequential write partition is a logical address to physical address mapping for the first logical address in a set of eight logical addresses that have been sequentially written.

As noted above, the processing device can determine to include a single non-sequential write partition and zero or more sequential write partitions. Accordingly, the processing device can selectively utilize sequential write partitions for obtaining optimization when appropriate but revert back to the non-sequential write partition that does not exploit sequential writes for efficiently processing read requests. For example, the processing device can determine to utilize one or more sequential write partitions in the logical-to-physical table cache when processing memory requests as part of a benchmark or for processing a request for a large file (e.g., a video, that is likely sequentially written). However, the processing device can determine to utilize zero sequential write partitions in the logical-to-physical table cache when processing memory requests that are not part of a benchmark or for processing a request for a large file. Similarly, the processing device can determine a size for each partition of the logical-to-physical table cache based on one or more factors, including use of the partitions (e.g., when a particular sequential write partition is heavily used, the processing device can increase the space in the logical-to-physical table cache associated with this sequential write partition).

Figure 3:
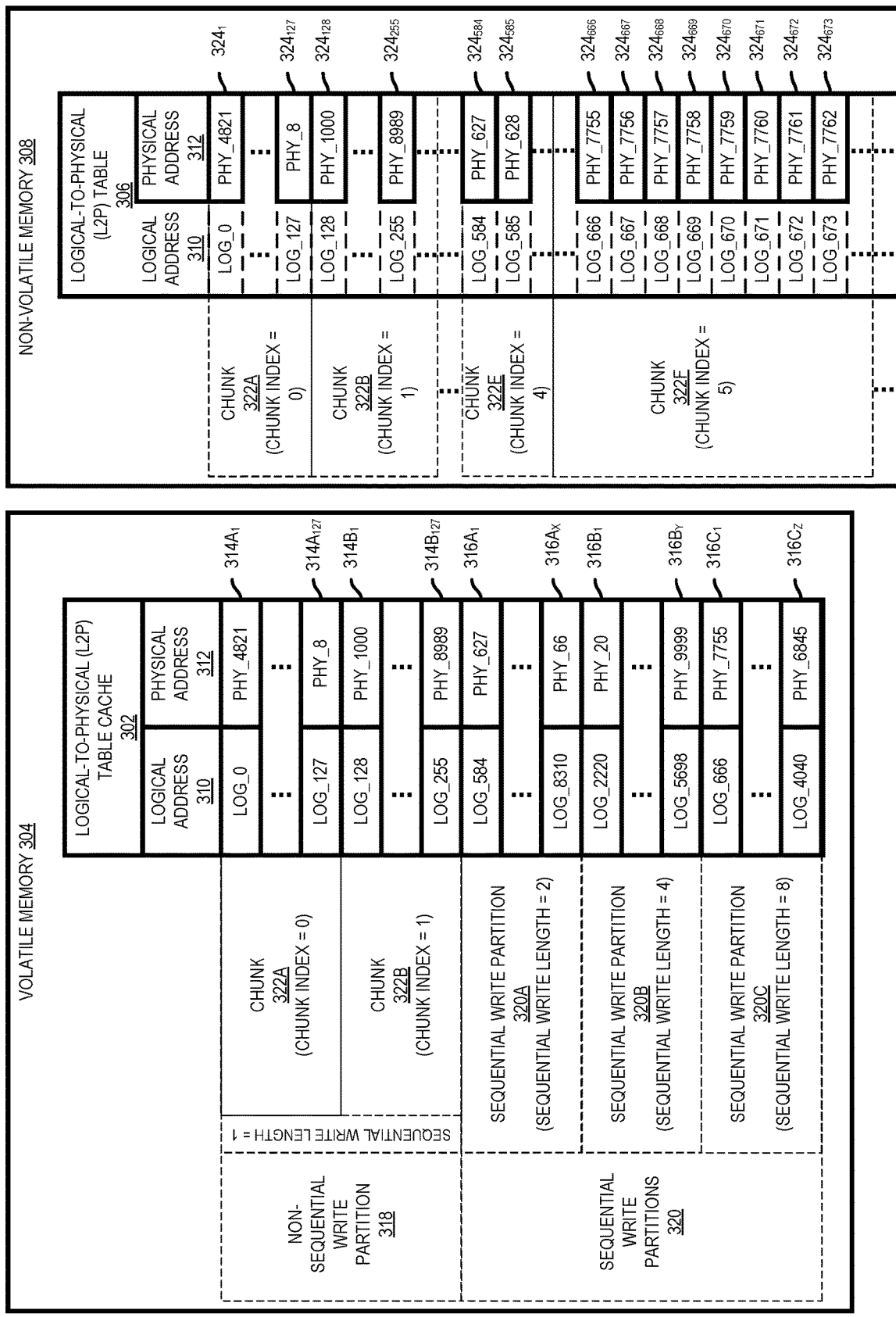
FIG. 3 shows a logical-to-physical table cache and a logical-to-physical table, in accordance with some embodiments of the present disclosure.

At operation 204, the processing device constructs the logical-to-physical table cache based on the determined number of partitions and the sequential write lengths per partition. For example, FIG. 3 shows a logical-to-physical table cache 302 (sometimes referred to as a partitioned logical-to-physical table cache 302) that is stored in volatile memory 304 (e.g., local memory 119) and a logical-to-physical table 306 (sometimes referred to as a full logical-to-physical table 306) that is stored in non-volatile memory 308 (e.g., the memory components 112A to 112N), according to one embodiment. As described herein, the memory components 112A to 112N, for which the processing devices uses the logical-to-physical table cache 302 and the logical-to-physical table 306, are a negative-and (NAND) type flash memory or another type of memory that does not facilitate in-place write operations (i.e., memory technologies that do not permit writing to memory elements without an intervening erase operation). Accordingly, the processing device writes data from a write request to a set of free physical addresses 312 instead of the physical addresses 312 previously associated with the set of logical addresses 310 of the write request.

Although described as the memory components 112A to 112N being NAND-type flash memory or another type of memory that does not facilitate in-place write operations, the processing device can apply the techniques described herein in a similar fashion to write-in-place memories (i.e., memory technologies that allow directly writing to a physical memory address 312 without an intervening erase operation). For example, the memory components 112A to 112N can be a cross-point array of non-volatile memory cells, which is a write-in-place memory. Accordingly, the techniques described herein can be applied to any memory type that is susceptible to wear based on the number of write cycles as these techniques will allow for even wear leveling to maximize memory subsystem 110 life.

The logical-to-physical table cache 302 can be viewed as a cache of logical address to physical address mappings at various granularities (e.g., each entry 314/316 in the logical-to-physical table cache 302 can represent one or more logical address to physical address mappings based on a sequential write granularity of each partition 318/320), which are also reflected in the logical-to-physical table 306 in the non-volatile memory 308. In this configuration, the logical-to-physical table cache 302 stores a subset of entries/mappings from the logical-to-physical table 308. As shown in FIG. 3, the logical-to-physical table cache 302 includes (1) a non-sequential write partition 318 that has a sequential write length of one (i.e., entries 314 in the non-sequential write partition 318 correspond to logical addresses 310 with no sequential write requirement) and (2) a set of sequential write partitions 320 that each have a sequential write length that is greater than or equal to two (i.e., each entry 316 in the set of sequential write partitions 320 corresponds to logical addresses 310 that have been written sequentially with a number of logical addresses 310 equal to the associated sequential write length of the sequential write partition 320). Since the logical-to-physical table cache 302 is a cache for the logical-to-physical table 306, the entries 314 and 316 of the logical-to-physical table cache 302 are consistent with the entries 324 of the logical-to-physical table 306 based on swaps and evictions of entries 314/316 and 324 between the logical-to-physical table cache 302 and the logical-to-physical table 306.

In the example of FIG. 3, the non-sequential write partition 318 is populated with entries 314 from two chunks 322A and 322B of logical addresses 310 from the logical-to-physical table 306. In particular, the logical-to-physical table 306 can be divided into sets of chunks 322 and each chunk 322 represents a set of sequential logical addresses 310. For example, each chunk 322 corresponds to sequential groups of 128 logical addresses 310 (e.g., the chunk 322A corresponds to the logical addresses LOG_0-LOG_127, the chunk 322B corresponds to the logical addresses LOG_128-LOG_255, etc.). Since the logical-to-physical table 306 can be too large to fit in the limited space available to the processing device in the volatile memory 304, the processing device can load a subset of the chunks 322 into the non-sequential write partition 318 of the logical-to-physical table cache 302. As shown in FIG. 3, the processing device has loaded chunk 322A (corresponding to a chunk index of zero) and chunk 322B (corresponding to a chunk index of one) into the non-sequential write partition 318 of the logical-to-physical table cache 302. However, the processing device can swap other chunks 322 into the non-sequential write partition 318 as needed (i.e., in response to a miss in all the entries 314 and 316 of the logical-to-physical table cache 302). As noted above, the sequential write length for the non-sequential write partition 318 is one, which indicates that each entry 314 in the non-sequential write partition 318 can only be used to translate a single logical address 310 to a single physical address 312. For example, the entry $314A_1$ indicates that the logical address LOG_0 is mapped to the physical address PHY_4821. However, in contrast to the entries 316 of the sequential write partitions 320, which will be described in greater detail below, since the logical address LOG_0 was not written sequentially together with any adjacent logical addresses 310 (e.g., the logical addresses LOG_0 and LOG_1 were not written sequentially), the entry $314A_1$ cannot be used to identify a physical address 312 in relation to any other logical address 310 (e.g., the entry $314A_1$ cannot be used to identify a physical address 312 in relation to the logical address LOG_1 as there is no sequential relationship between the logical address LOG_0 and the logical address LOG_1 indicated by the logical-to-physical table cache 302).

As also shown in FIG. 3, the processing device has constructed the logical-to-physical table cache 302 at operation 204 to include a first sequential write partition 320A, a second sequential write partition 320B, and a third sequential write partition 320C. The first sequential write partition 320A includes entries $316A_1$-$316A_X$ that indicate a single logical address to physical address mapping for each set of two logical addresses 310 that have been sequentially written. For example, the first sequential write partition 320A includes an entry $316A_1$ that indicates a first logical address to physical address mapping for the logical addresses LOG_584 and LOG_585 that were sequentially written. In particular, since the logical addresses LOG_584 and LOG_585 were sequentially written and the logical address LOG_584 is mapped to physical address PHY_627, as indicated by the entry $316A_1$, the logical address LOG_585 is mapped to physical address PHY_628. Accordingly, each entry $316A_1$-$316A_X$ in the first sequential write partition 320A indicates physical addresses 312 for two sequentially written logical addresses 310 using a single logical address to physical address mapping (i.e., using a single entry 316A). Similarly, the second sequential write partition 320B includes an entry $316B_1$ that indicates a first logical address to physical address mapping for the logical addresses LOG_2220-LOG_2223 that were sequentially written. In particular, since the logical addresses LOG_2220-LOG_2223 were sequentially written and the logical address LOG_2220 is mapped to physical address PHY_20, as indicated by the entry $316B_1$, the logical addresses LOG_2221-LOG_2223 are mapped to physical addresses PHY_21-PHY_23, respectively. Accordingly, each entry $316B_1$-$316B_Y$ in the second sequential write partition 320B indicates physical addresses 312 for four sequentially written logical addresses 310 using a single logical address to physical address mapping (i.e., using a single entry 316B). Likewise, the third sequential write partition 320C includes an entry $316C_1$ that indicates a first logical address to physical address mapping for the logical addresses LOG_666-LOG_673 that were sequentially written. In particular, since the logical addresses LOG_666-LOG_673 were sequentially written and the logical address LOG_666 is mapped to physical address PHY_7755, as indicated by the entry $316C_1$, the logical addresses LOG_667-LOG_673 are mapped to physical addresses PHY_7756-PHY_7762, respectively. Accordingly, each entry $316C_1$-$316C_Z$ in the third sequential write partition 306C indicates physical addresses 312 for eight sequentially written logical addresses 310 using a single logical address to physical address mapping (i.e., using a single entry 316C).

Although shown with three sequential write partitions 320 (e.g., the sequential write partitions 320A-320C), the processing device can construct the logical-to-physical table cache 302 using any number of sequential write partitions 320 (e.g., zero or more sequential write partitions 320). As shown, the non-sequential write partitions 318 and the sequential write partitions 320 in FIG. 3 have sequential write lengths that are powers of each other (i.e., the sequential write length for the non-sequential write partition 318 is $2^0$, the sequential write length for the sequential write partition 320A is $2^1$, the sequential write length for the sequential write partition 320B is $2^2$, and the sequential write length for the sequential write partition 320C is $2^3$). However, in other embodiments, the sequential write lengths for each of the non-sequential write partition 318 and the sequential write partitions 320 can have any relationship. For example, the sequential write lengths can be sequential (e.g., the sequential write length for the non-sequential write partition 318 is 1, the sequential write length for the sequential write partition 320A is 2, the sequential write length for the sequential write partition 320B is 3, and the sequential write length for the sequential write partition 320C is 4), the sequential write lengths can be multiples of each other (e.g., the sequential write length for the sequential write partition 320A is 2, the sequential write length for the sequential write partition 320B is 6, and the sequential write length for the sequential write partition 320C is 18), etc.

In some embodiments, the amount of space allocated to each sequential write partition 320 and/or the non-sequential write partition 318 can be variable. Namely, as new sequentially written logical addresses 310 are located that correspond to a sequentially written length of a sequential write partition 320, the processing device can expand the amount of space in the volatile memory 304 allocated to the sequential write partition 320 such that a new entry 316 can be added to the sequential write partition 320. In some embodiments, the processing device can take the new space allocated to the sequential write partition 320 from space that the processing device has previously allocated to the non-sequential write partition 318. As previously sequentially written logical addresses 310 are rewritten non-sequentially and corresponding entries 316 are removed from the sequential write partitions 320, the processing device can reduce space allocated to the sequential write partitions 320 and expand space allocated to the non-sequential write partition 318.

In some embodiments, the processing device can allocate space to each of the non-sequential write partition 318 and the set of sequential write partitions 320 based on use of each partition 318/320 (e.g., the number of hits to each partition 318/320). For example, the processing device can allocate space to each partition based on the ratio of the number of hits to each partition 318/320 and the number of hits to all partitions 318/320. In this embodiment, the sequential write partitions 320 could not include entries 316 for each set of sequentially written logical addresses 310 as space in the sequentially written partition 320 is limited. For example, when space does not permit inclusion of entries 316 for each set of sequentially written logical addresses 310, the processing device can evict entries 316 based on age (i.e., the oldest entry 316 in a corresponding sequential write partition 320 is evicted in favor of a new entry 316 for a newly sequentially written set of logical addresses 310).

At operation 206, the processing device determines whether a write request directed to the memory components 112A to 112N has been detected (e.g., a write request for the memory components 112A to 112N has been received from the host system 120 or an internally triggered write request (e.g., a write request for wear leveling or garbage collection) was detected). For example, the write request can indicate (1) a starting logical address 310 to begin a write operation; (2) a length, which indicates the number of logical addresses 310 involved in the write operation, and (3) data to be written to the memory components 112A to 112N. For instance, a write request could indicate a starting address of logical address LOG_0; a length of 128 (i.e., 128 logical address 310, including the starting logical address 310); and 128 KB of data to be written to the memory components 112A to 112N (e.g., a text string, image data, etc.). In response to the processing device detecting a write request at operation 206, the method 200 moves to operation 208.

At operation 208, the processing device writes the data from the write request to memory elements in the memory components 112A to 112N. As described herein, the memory components 112A to 112N are NAND-type flash memory or another type of memory that does not facilitate in-place write operations (i.e., memory technologies that do not permit writing to memory elements without an intervening erase operation). Accordingly, the processing device writes data from the write request to a set of free physical addresses 312 instead of the physical addresses 312 previously associated with the set of logical addresses 310 of the write request.

Figure 4:
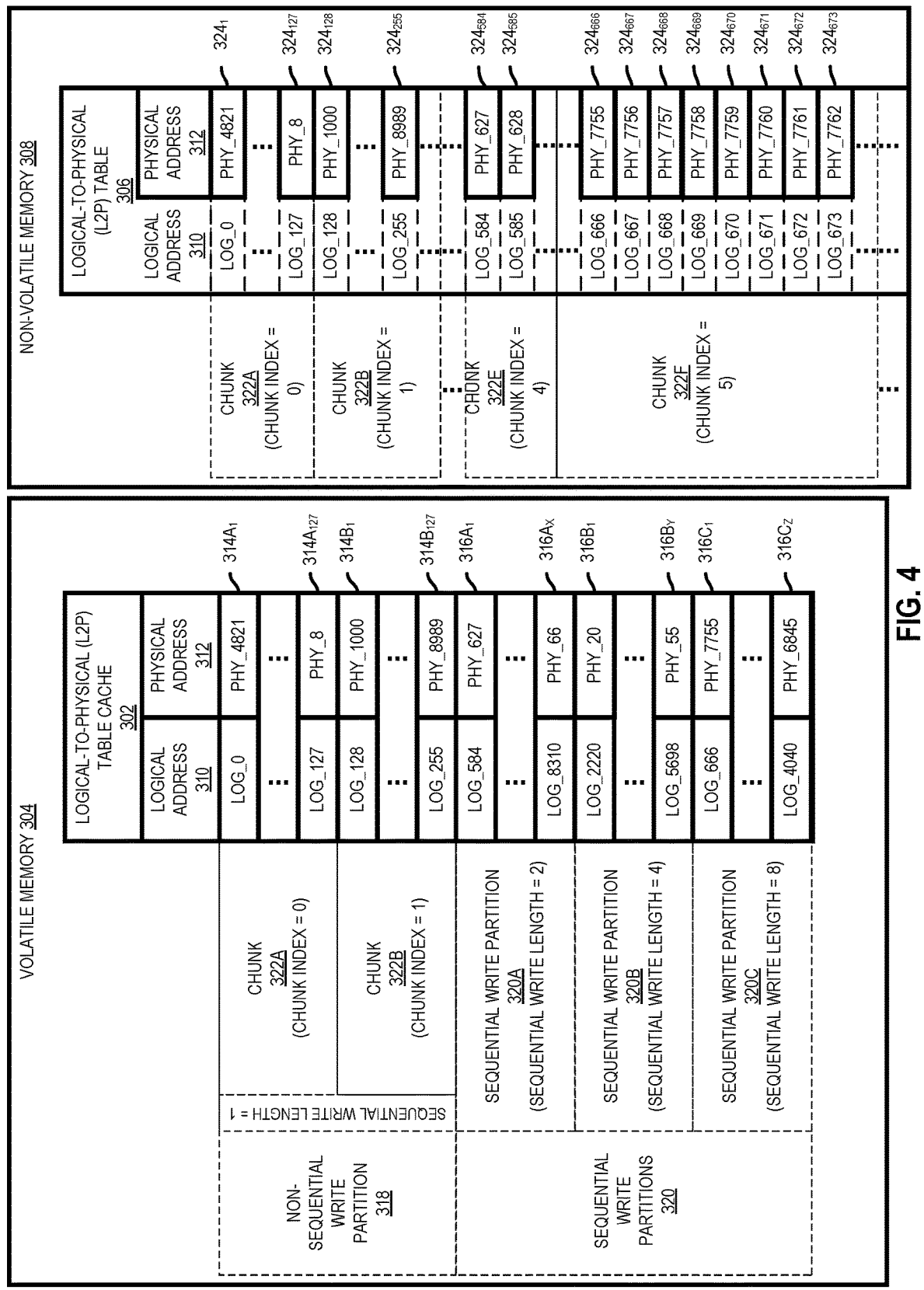
FIG. 4 shows a logical-to-physical table cache updated based on a sequential write to eight sequential logical addresses, in accordance with some embodiments of the present disclosure.

At operation 210, the processing device updates the logical-to-physical table cache 302 and/or the logical-to-physical table 306 based on the write to the memory components 112A to 112N. Namely, the processing device updates any entries 314/316 and 324 in one or more of the logical-to-physical table cache 302 and the logical-to-physical table 306 to reflect updated logical address to physical address mappings that were precipitated by the write to the memory components 112A to 112N. For example, when the processing device performs a write to a set of four sequential physical addresses 312 at operation 208 based on a write request involving a set of four sequential logical addresses 310, the processing device adds or updates a corresponding entry 316B in the sequential write partition 320B to indicate the new logical address to physical address mappings as a result of the write. For instance, FIG. 4 shows an update to the logical-to-physical table cache 302 in response to writing the physical addresses PHY_55-PHY_58 to fulfill a write request involving the logical addresses LOG_5698-LOG_5701. In particular, the entry $316B_Y$ is updated to reference the physical address PHY_55. The processing device can later update the logical-to-physical table 306 in response to an eviction of the entry $316B_Y$ from the logical-to-physical table cache 302 or a non-sequential write to one or more of the logical addresses LOG_5698-LOG_5701.

Figure 5:
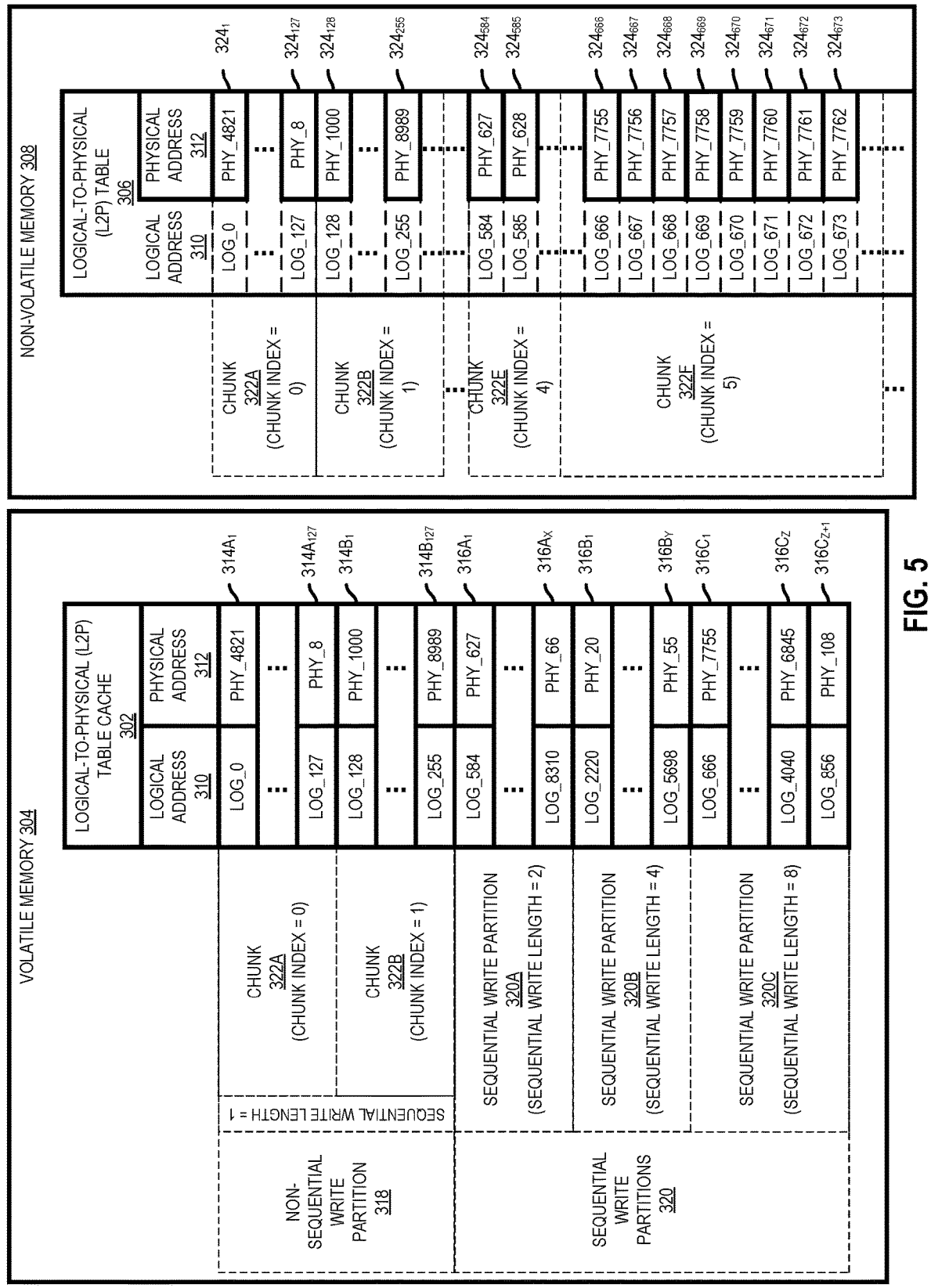
FIG. 5 shows a logical-to-physical table cache updated based on a sequential write to four sequential logical addresses, in accordance with some embodiments of the present disclosure.

FIG. 5 shows an update to the logical-to-physical table cache 302 based on a write to a set of eight physical addresses 312 to fulfill a write request involving a set of eight sequential logical addresses 310. Namely, FIG. 5 shows an addition of an entry 316 to the logical-to-physical table cache 302 in response to writing the physical addresses PHY_108-PHY_115 to fulfill a write request involving the logical addresses LOG_856-LOG_863. In particular, the processing device adds the entry $316C_{Z+1}$ to the sequential write partition 320C to map the logical address LOG_856 to the physical address PHY_108. The processing device can later update the logical-to-physical table 306 in response to an eviction of the entry $316C_{Z+1}$ from the logical-to-physical table cache 302 or a non-sequential write to one or more of the logical addresses LOG_856-LOG_863.

As described herein, each sequential write partition 320 implies its associated sequential write length without the need to store the sequential write length. Accordingly, the processing device is aware that (1) the sequential write partition 320A includes entries 314A that correspond to two sequentially written logical addresses 310 such that only one physical address 312 needs to be recorded in the sequential write partition 320A to represent two corresponding physical addresses 312, (2) the sequential write partition 320B includes entries 314B that correspond to four sequentially written logical addresses 310 such that only one physical address 312 needs to be recorded in the sequential write partition 320B to represent four corresponding physical addresses 312, and (3) the sequential write partition 320C includes entries 314C that correspond to eight sequentially written logical addresses 310 such that only one physical address 312 needs to be recorded in the sequential write partition 320C to represent eight corresponding physical addresses 312.

Following operation 210 or a determination that a write request was not detected at operation 206, the method 200 moves to operation 212. At operation 212, the processing device determines if a read request was detected (e.g., a read request received from the host system 120). In response to the processing device determining that a read request was not detected at operation 212, the method 200 returns to operation 206 to again determine if a write request has been detected. Conversely, in response to the processing device determining that a read request was detected at operation 212, the method 200 moves to operation 214.

At operation 214, the processing device uses the logical-to-physical table cache 302 to translate a set of logical addresses 310 of the detected read request to a set of physical addresses 312. In particular, the processing device compares the set of logical addresses 310 of the read request with logical addresses 310 of entries 314 and/or 316 in the logical-to-physical table cache 302. For example, the processing device can first compare the set of logical addresses 310 of the read request with entries 314 of the non-sequential write partition 318 to determine a corresponding set of physical addresses 312. In response to failing to determine a match for one or more logical addresses 310 in the set of logical addresses 310 of the read request, the processing device can compare the remaining logical addresses 310 from the set of logical addresses 310 of the read request with entries 316 from the sequential write partitions 320. In one embodiment, when a hit is detected in a sequential write partition 320 for a logical address 310 of a read request, a corresponding number of logical addresses 310 of the read request are skipped for purposes of comparison with the sequential write partitions 320 (e.g., there is a hit for a logical address 310 of a read request and the sequential write partition 320B, which has a sequential write length of four, the processing device can skip the next three logical addresses 310 of the read request and these logical addresses 310 can be translated based on the hit in the sequential write partition 320B). In some embodiments, the length of the read request (e.g., the number of logical addresses 310 represented in the read request) is used for determining an initial sequential write partition 320 to perform a comparison. For example, if a write request references four logical addresses, the processing device can compare the first logical address of the read request with the sequential write partition 320B, as this sequential write partition 320B has a sequential write length of four and a hit might offer a substantial efficiency improvement.

In one embodiment, the processing device initially compares the set of logical addresses 310 of the read request with entries 316 of the sequential write partition 320 with the largest sequential write length (e.g., the sequential write partition 320C, which has a sequential write length of eight). After a miss for one or more logical addresses 310 in the sequential write partition 320 with the largest sequential write length, the processing device compares the set of logical addresses 310 of the read request with entries 316 of the sequential write partition 320 with the next largest sequential write length until all sequential write partitions 320 have been exhausted. Accordingly, the processing device can attempt to translate the set of logical addresses 310 of the read request using one or more partitions 318/320 of the logical-to-physical table cache 302, including the set of sequential partitions 320, to determine a set of physical addresses 312. By using the set of sequential partitions 320, the processing device can achieve greater efficiency when translating sequentially written logical addresses 310. Namely, since sequentially written logical addresses 310 also have corresponding sequential physical addresses 312, a single entry 316 and single translation from the set of sequential write partitions 320 can be utilized to translate all or at least multiple logical addresses 310. This potentially reduces the number of entries 314/316 needed in the logical-to-physical table cache 302 and reduces the number of lookups needed to translate a sequentially written set of logical addresses 310 of a read request.

Although described as utilizing the non-sequential write partition 318 prior to the set of sequential write partitions 320, in some embodiments, the processing device can first attempt to translate the set of logical addresses of a read request using the set of sequential partitions 320 prior to relying on the non-sequential write partition 318. In these embodiments, the processing device can attempt to yield a quick translation of the logical addresses 310 when the processing device assumes the read request is associated with a large set of sequentially written logical addresses 310 (e.g., the read request is associated with a large file). In some embodiments, the processing device can attempt to translate the set of logical addresses of a read request by simultaneously searching (1) the non-sequential write partition 318 and (2) one or more of the sequential write partitions 320. For example, the processing device can translate the set of logical addresses of a read request by simultaneously searching (1) the non-sequential write partition 318 and (2) each of the sequential write partitions 320. Although this approach could require more processing resources than searching partitions 318/320 individually, the processing device can translate the set of logical addresses of a read request in a reduced amount of time.

In response to the processing device failing to establish hits for each logical address 310 in the set of logical addresses 310 of the read request based on entries 314 in the non-sequential write partition 318 and entries 316 in the set of sequential write partitions 320, the processing device swaps one or more chunks 322 of logical addresses 310 from the logical-to-physical table 306 into the non-sequential write partition 318 of the logical-to-physical table cache 302 such that the processing device can locate corresponding logical address to physical address mappings for logical addresses 310 of the write request that the processing device has, as of yet, failed to locate mappings in the logical-to-physical table cache 302. Accordingly, when necessary, the processing device can use both the logical-to-physical table cache 302 in conjunction with the logical-to-physical table 306 to translate the set of logical addresses 310 of the read request to physical addresses 312.

At operation 216, the processing device performs a read operation using the determined set of physical addresses 310 from operation 214. In particular, the processing device reads data memory elements from the memory components 112A to 112N corresponding to the determined set of physical addresses 310 and returns the data to the requesting party (e.g., the host system 120). Following operation 216, the method 200 returns to operation 206 to again determine if a write request has been detected.

Figure 6A:
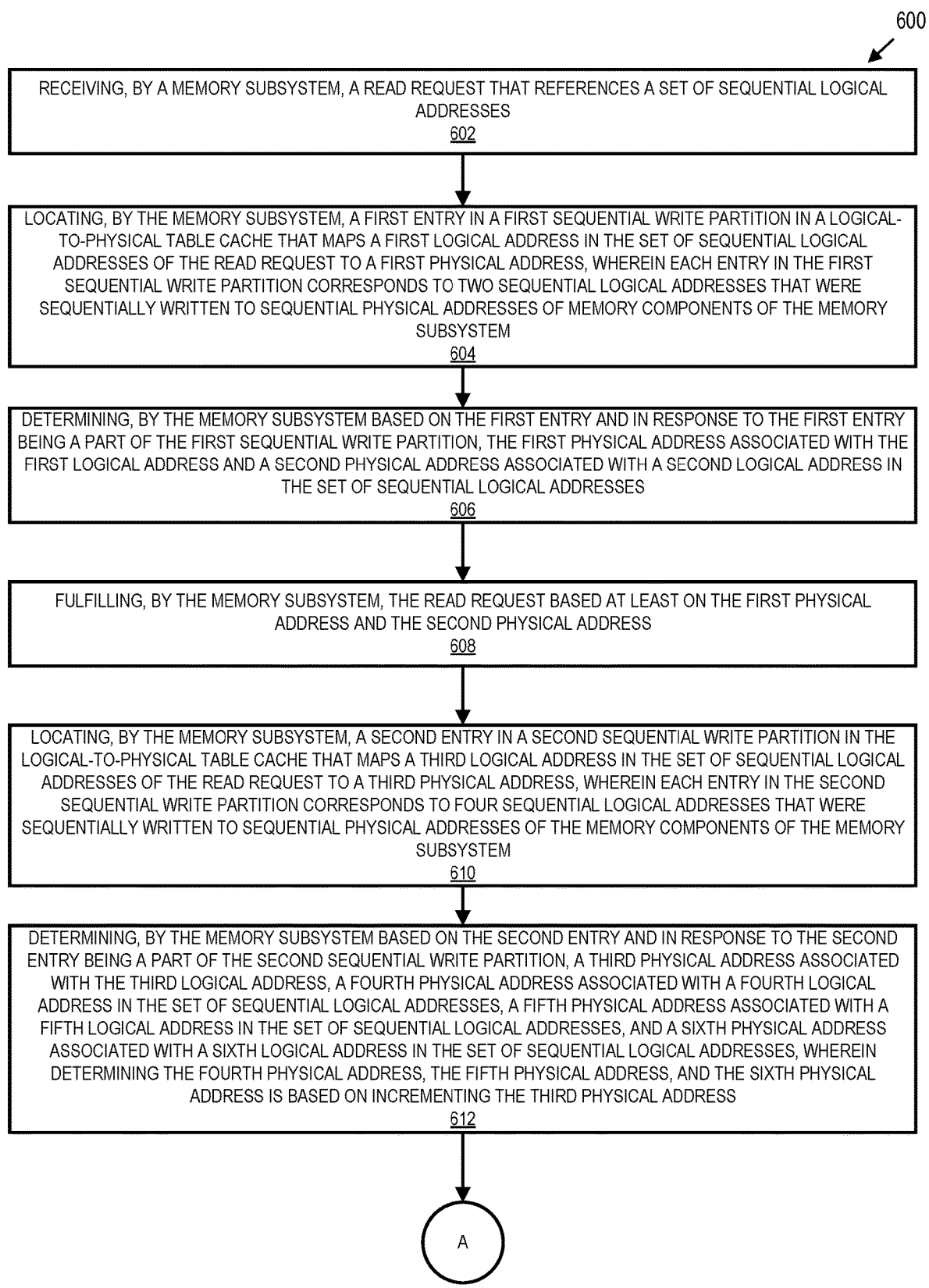
FIGS. 6A and 6B are a flow diagram of another example method to manage sequential-write-based partitions in a logical-to-physical table cache, in accordance with some embodiments of the present disclosure.
Figure 6B:
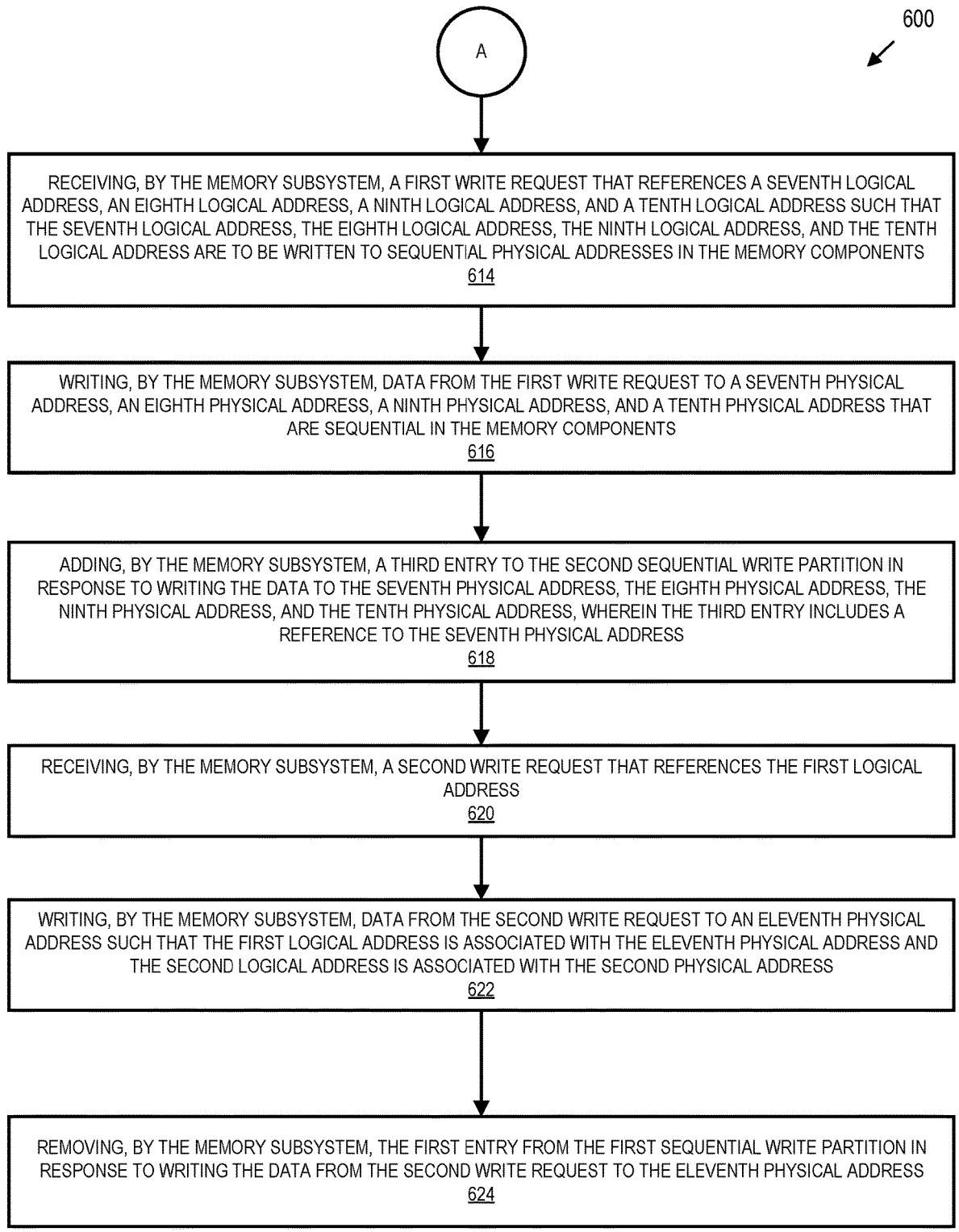

FIGS. 6A and 6B are a flow diagram of another example method 600 to manage sequential-write-based partitions in a logical-to-physical table cache, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the memory manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 602, the processing device receives a read request that references a set of sequential logical addresses 310.

At operation 604, the processing device locates a first entry 316A in a first sequential write partition 320A in the logical-to-physical table cache 302 that maps a first logical address 310 in the set of sequential logical addresses 310 of the read request to a first physical address 312. In this example, each entry 316A in the first sequential write partition 320A corresponds to two sequential logical addresses 310 that were sequentially written to sequential physical addresses 312 of memory components 112A to 112N.

At operation 606, the processing device determines, based on the first entry 316A and in response to the first entry 316A being a part of the first sequential write partition 320A, the first physical address 312 associated with the first logical address 310 and a second physical address 312 associated with a second logical address 310 in the set of sequential logical addresses 310.

At operation 608, the processing device fulfills the read request based at least on the first physical address 312 and the second physical address 312. In one embodiment, the logical-to-physical table cache 302 includes a non-sequential write partition 318 that includes entries 314 that map chunks 322 of logical addresses 310 to physical addresses 312 irrespective of whether each logical address 310 was written sequentially with another logical address 310. In some embodiments, the processing device attempts to locate a match for a logical address 310 in the set of sequential logical addresses 310 in the non-sequential write partition 318 either (1) prior to attempting to locate a match in the first sequential write partition 320A or (2) after failing to locate a match in the first sequential write partition 320A. As described above, the logical-to-physical table cache 302 is stored in volatile memory 304 of the memory subsystem 110 and acts as a cache for a logical-to-physical table 306 stored in non-volatile memory 308. In some embodiments, determining the second physical address 312 includes incrementing the first physical address 312.

At operation 610, the processing device locates a second entry 316B in a second sequential write partition 320B in the logical-to-physical table cache 302 that maps a third logical address 310 of the read request in the set of sequential logical addresses 310 to a third physical address 312. Each entry 316B in the second sequential write partition 320B corresponds to four sequential logical addresses 310 that were sequentially written to sequential physical addresses 312 of the memory components 112A to 112N.

At operation 612, the processing device determines, based on the second entry 316B and in response to the second entry 316B being a part of the second sequential write partition 320B, a third physical address 312 associated with the third logical address 310, a fourth physical address 312 associated with a fourth logical address 310 in the set of sequential logical addresses 310, a fifth physical address 312 associated with a fifth logical address 310 in the set of sequential logical addresses 310, and a sixth physical address 312 associated with a sixth logical address 310 in the set of sequential logical addresses 310. In some embodiments, the determining of the fourth physical address 312, the fifth physical address 312, and the sixth physical address 312 is based on incrementing the third physical address 312.

At operation 614, the processing device receives a first write request that references a seventh logical address 310, an eighth logical address 310, a ninth logical address 310, and a tenth logical address 310 such that the seventh logical address 310, the eighth logical address 310, the ninth logical address 310, and the tenth logical address 310 are to be written to sequential physical addresses 312 in the memory components 112A to 112N.

At operation 616, the processing device writes data from the first write request to a seventh physical address 312, an eighth physical address 312, a ninth physical address 312, and a tenth physical address 312 that are sequential in the memory components 112A to 112N.

At operation 618, the processing device adds a third entry 316B to the second sequential write partition 320B in response to writing the data to the seventh physical address 312, the eighth physical address 312, the ninth physical address 312, and the tenth physical address 312. In this example, the third entry 316B includes a reference to the seventh physical address 312. Further, the processing device adds the third entry 316B to the second sequential write partition 320B because the write of data includes four logical address 310 and consequentially four physical addresses 312 (i.e., the second sequential write partition 320B is used to represent sequential writes of four logical address 310).

At operation 620, the processing device receives a second write request that references the first logical address 310. For example, the processing device receives a write request from the host system 120 that seeks to write to the first logical address 310.

At operation 622, the processing device writes data from the second write request to an eleventh physical address 312 such that the first logical address 310 is associated with the eleventh physical address 312 and the second logical address 310 is associated with the second physical address 312. Accordingly, based on the second write request, the first and second logical addresses 312 are no longer sequentially written since they are mapped to non-sequential physical addresses 312 (i.e., the eleventh physical address 312 and the second physical address 312, respectively).

At operation 624, the processing device removes the first entry 316A from the first sequential write partition 320A in response to writing the data from the second write request to the eleventh physical address 312. In particular, since the first and second logical addresses 312 are no longer sequentially written, the first entry 316A that indicated that the first and second logical addresses 312 were sequentially written is removed from the first sequential write partition 320A.

Figure 7:
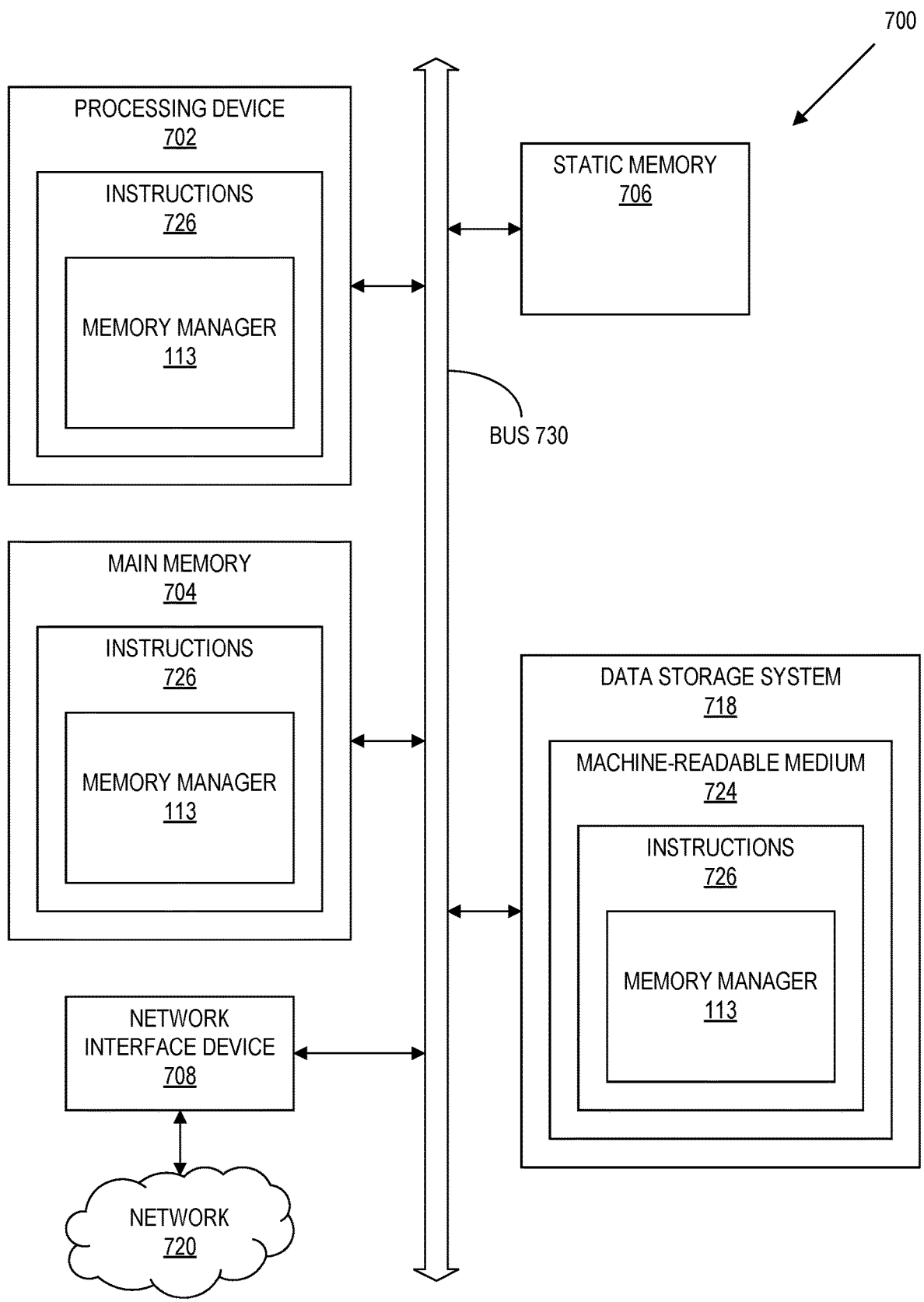
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the memory manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory subsystem 110 of FIG. 1.

In one embodiment, the instructions 726 include instructions to implement functionality corresponding to a memory manager (e.g., the memory manager 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented method 200 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for managing sequential-write-based partitions in a logical-to-physical table cache, the method comprising:
  receiving, by a memory subsystem, a read request that references a set of sequential logical addresses;
  locating, by the memory subsystem, a first entry in a first sequential write partition in the logical-to-physical table cache that maps a first logical address in the set of sequential logical addresses of the read request to a first physical address, wherein each entry in the first sequential write partition, which includes a plurality of entries, corresponds to two sequential logical addresses that were sequentially written to sequential physical addresses of memory components of the memory subsystem;
  determining, by the memory subsystem based on the first entry and in response to the first entry being a part of the first sequential write partition from a plurality of sequential write partitions in the logical-to-physical table cache, the first physical address associated with the first logical address and a second physical address associated with a second logical address in the set of sequential logical addresses; and fulfilling, by the memory subsystem, the read request based at least on the first physical address and the second physical address.

2. The method of claim 1, wherein determining the second physical address includes incrementing the first physical address.

3. The method of claim 1, further comprising:

locating, by the memory subsystem, a second entry in a second sequential write partition from the plurality of sequential write partitions in the logical-to-physical table cache that maps a third logical address in the set of sequential logical addresses of the read request to a third physical address, wherein each entry in the second sequential write partition corresponds to four sequential logical addresses that were sequentially written to sequential physical addresses of the memory components of the memory subsystem; and determining, by the memory subsystem based on the second entry, a third physical address associated with the third logical address, a fourth physical address associated with a fourth logical address in the set of sequential logical addresses, a fifth physical address associated with a fifth logical address in the set of sequential logical addresses, and a sixth physical address associated with a sixth logical address in the set of sequential logical addresses, wherein determining the fourth physical address, the fifth physical address, and the sixth physical address is based on incrementing the third physical address.

4. The method of claim 3, further comprising:

receiving, by the memory subsystem, a first write request that references a seventh logical address, an eighth logical address, a ninth logical address, and a tenth logical address such that the seventh logical address, the eighth logical address, the ninth logical address, and the tenth logical address are to be written to sequential physical addresses in the memory components;

writing, by the memory subsystem, data from the first write request to a seventh physical address, an eighth physical address, a ninth physical address, and a tenth physical address that are sequential in the memory components; and adding, by the memory subsystem, a third entry to the second sequential write partition in response to writing the data to the seventh physical address, the eighth physical address, the ninth physical address, and the tenth physical address, wherein the third entry includes a reference to the seventh physical address.

5. The method of claim 4, further comprising:

receiving, by the memory subsystem, a second write request that references the first logical address;

writing, by the memory subsystem, data from the second write request to an eleventh physical address such that the first logical address is associated with the eleventh physical address and the second logical address is associated with the second physical address; and removing, by the memory subsystem, the first entry from the first sequential write partition in response to writing the data from the second write request to the eleventh physical address.

6. The method of claim 1, wherein the logical-to-physical table cache includes a non-sequential write partition that includes entries that map chunks of logical address to physical addresses irrespective of whether each logical address was written sequentially with another logical address, and wherein the memory subsystem attempts to locate a match for a logical address in the set of sequential logical addresses in the non-sequential write partition (1) prior to attempting to locate a match in the first sequential write partition (2) after failing to locate a match in the first sequential write partition, or (3) simultaneous with attempting to locate a match in the first sequential write partition.

7. The method of claim 1, wherein the logical-to-physical table cache is stored in volatile memory of the memory subsystem and acts as a cache for a logical-to-physical table stored in non-volatile memory.

8. A memory subsystem for managing sequential-write-based partitions in a logical-to-physical table cache, the system comprising:

a memory component; and a processing device, coupled to the memory component, configured to:

detect a read request that references a set of sequential logical addresses;

locate a first entry in a first sequential write partition in the logical-to-physical table cache that maps a first logical address in the set of sequential logical addresses of the read request to a first physical address, wherein each entry in the first sequential write partition, which includes a plurality of entries, corresponds to N sequential logical addresses that were sequentially written to N sequential physical addresses of the memory component and includes a single reference to a physical address;

determine, based on the first entry and in response to the first entry being a part of the first sequential write partition from a plurality of sequential write partitions in the logical-to-physical table cache, the first physical address associated with the first logical address and a second physical address associated with a second logical address in the set of sequential logical addresses; and fulfill the read request based at least on the first physical address and the second physical address.

9. The memory subsystem of claim 8, wherein determining the second physical address includes incrementing the first physical address.

10. The memory subsystem of claim 8, wherein the processing device is further configured to:

locate a second entry in a second sequential write partition from the plurality of sequential write partitions in the logical-to-physical table cache that maps a third logical address in the set of sequential logical addresses of the read request to a third physical address, wherein each entry in the second sequential write partition corresponds to four sequential logical addresses that were sequentially written to sequential physical addresses of the memory components of the memory subsystem; and determine, based on the second entry, a third physical address associated with the third logical address, a fourth physical address associated with a fourth logical address in the set of sequential logical addresses, a fifth physical address associated with a fifth logical address in the set of sequential logical addresses, and a sixth physical address associated with a sixth logical address in the set of sequential logical addresses, wherein determining the fourth physical address, the fifth physical address, and the sixth physical address is based on incrementing the third physical address.

11. The memory subsystem of claim 10, wherein the processing device is further configured to:
   receive a first write request that references a seventh logical address, an eighth logical address, a ninth logical address, and a tenth logical address such that the seventh logical address, the eighth logical address, the ninth logical address, and the tenth logical address are to be written to sequential physical addresses in the memory components;
   write data from the first write request to a seventh physical address, an eighth physical address, a ninth physical address, and a tenth physical address that are sequential in the memory components; and
   add a third entry to the second sequential write partition in response to writing the data to the seventh physical address, the eighth physical address, the ninth physical address, and the tenth physical address,
   wherein the third entry includes a reference to the seventh physical address.

12. The memory subsystem of claim 11, wherein the processing device is further configured to:
   receive a second write request that references the first logical address;
   write data from the second write request to an eleventh physical address such that the first logical address is associated with the eleventh physical address and the second logical address is associated with the second physical address; and
   remove the first entry from the first sequential write partition in response to writing the data from the second write request to the eleventh physical address.

13. The memory subsystem of claim 8, wherein the logical-to-physical table cache includes a non-sequential write partition that includes entries that map chunks of logical address to physical addresses irrespective of whether each logical address was written sequentially with another logical address, and
   wherein the memory subsystem attempts to locate a match for a logical address in the set of sequential logical addresses in the non-sequential write partition (1) prior to attempting to locate a match in the first sequential write partition (2) after failing to locate a match in the first sequential write partition, or (3) simultaneous with attempting to locate a match in the first sequential write partition.

14. The memory subsystem of claim 8, wherein the logical-to-physical table cache is stored in volatile memory of the memory subsystem and acts as a cache for a logical-to-physical table stored in non-volatile memory.

15. A non-transitory computer-readable storage medium comprising instructions that, when executed by a processing device, cause the processing device to:
   receive a read request that references a set of sequential logical addresses;
   locate a first entry in a first sequential write partition in a logical-to-physical table cache that maps a first logical address in the set of sequential logical addresses of the read request to a first physical address, wherein each entry in the first sequential write partition, which includes a plurality of entries, corresponds to two sequential logical addresses that were sequentially written to sequential physical addresses of memory components of a memory subsystem;
   determine, based on the first entry and in response to the first entry being a part of the first sequential write partition from a plurality of sequential write partitions in the logical-to-physical table cache, the first physical address associated with the first logical address and a second physical address associated with a second logical address in the set of sequential logical addresses; and
   fulfill the read request based at least on the first physical address and the second physical address.

16. The non-transitory computer-readable storage medium of claim 15, wherein determining the second physical address includes incrementing the first physical address.

17. The non-transitory computer-readable storage medium of claim 15, wherein the processing device is further to:
   locate a second entry in a second sequential write partition from the plurality of sequential write partitions in the logical-to-physical table cache that maps a third logical address in the set of sequential logical addresses of the read request to a third physical address, wherein each entry in the second sequential write partition corresponds to four sequential logical addresses that were sequentially written to sequential physical addresses of the memory components of the memory subsystem; and
   determine, based on the second entry, a third physical address associated with the third logical address, a fourth physical address associated with a fourth logical address in the set of sequential logical addresses, a fifth physical address associated with a fifth logical address in the set of sequential logical addresses, and a sixth physical address associated with a sixth logical address in the set of sequential logical addresses,
   wherein determining the fourth physical address, the fifth physical address, and the sixth physical address is based on incrementing the third physical address.

18. The non-transitory computer-readable storage medium of claim 17, wherein the processing device is further to:
   receive a first write request that references a seventh logical address, an eighth logical address, a ninth logical address, and a tenth logical address such that the seventh logical address, the eighth logical address, the ninth logical address, and the tenth logical address are to be written to sequential physical addresses in the memory components;
   write data from the first write request to a seventh physical address, an eighth physical address, a ninth physical address, and a tenth physical address that are sequential in the memory components; and
   add a third entry to the second sequential write partition in response to writing the data to the seventh physical address, the eighth physical address, the ninth physical address, and the tenth physical address,
   wherein the third entry includes a reference to the seventh physical address.

19. The non-transitory computer-readable storage medium of claim 18, wherein the processing device is further to:
   receive a second write request that references the first logical address;
   write data from the second write request to an eleventh physical address such that the first logical address is associated with the eleventh physical address and the second logical address is associated with the second physical address; and remove the first entry from the first sequential write partition in response to writing the data from the second write request to the eleventh physical address.

20. The non-transitory computer-readable storage medium of claim 15, wherein the logical-to-physical table cache includes a non-sequential write partition that includes entries that map chunks of logical address to physical addresses irrespective of whether each logical address was written sequentially with another logical address, and wherein the memory subsystem attempts to locate a match for a logical address in the set of sequential logical addresses in the non-sequential write partition (1) prior to attempting to locate a match in the first sequential write partition (2) after failing to locate a match in the first sequential write partition, or (3) simultaneous with attempting to locate a match in the first sequential write partition.

* * * * *